(12) United States Patent
Kardos et al.

(10) Patent No.: US 8,100,106 B2
(45) Date of Patent: Jan. 24, 2012

(54) ARRANGEMENT FOR HEATING OIL IN A GEARBOX

(75) Inventors: Zoltan Kardos, Södertälje (SE); Hans Wikström, Johanneshov (SE); Erik Söderberg, Stockholm (SE)

(73) Assignee: Scania CV AB (Publ) (SE)

( * ) Notice: Subject to any disclaimer, the term of this patent is extended or adjusted under 35 U.S.C. 154(b) by 464 days.

(21) Appl. No.: 12/518,130

(22) PCT Filed: Jan. 16, 2008

(86) PCT No.: PCT/SE2008/050046
§ 371 (c)(1),
(2), (4) Date: Jun. 18, 2009

(87) PCT Pub. No.: WO2008/094110
PCT Pub. Date: Aug. 7, 2008

(65) Prior Publication Data
US 2010/0000475 A1    Jan. 7, 2010

(30) Foreign Application Priority Data
Jan. 30, 2007  (SE) ...................... 0700220

(51) Int. Cl.
*F01M 5/00*    (2006.01)
(52) U.S. Cl. ....... 123/196 AB; 123/196 R; 123/142.5 R; 184/106; 184/6.21; 184/6.22
(58) Field of Classification Search ........... 123/1 A, 123/196 R, 196 AB, 198 E, 142.5 R; 165/916; 184/106, 6.21, 6.22
See application file for complete search history.

(56) References Cited

U.S. PATENT DOCUMENTS

| | | | | |
|---|---|---|---|---|
| 5,678,461 A | * | 10/1997 | Stine | 74/606 A |
| 6,021,868 A | * | 2/2000 | Bogema | 184/104.3 |
| 6,457,564 B1 | * | 10/2002 | Damm et al. | 184/6.5 |
| 7,644,793 B2 | * | 1/2010 | Iwasaki et al. | 180/68.2 |
| 2002/0050251 A1 | * | 5/2002 | Takahashi et al. | 123/41.1 |

FOREIGN PATENT DOCUMENTS

| | | | |
|---|---|---|---|
| DE | 3201443 A1 | | 5/1983 |
| DE | 4431351 A1 | | 3/1996 |
| DE | 102005046514 A1 | * | 4/2007 |
| EP | 0736703 A1 | | 10/1996 |
| EP | 0787929 A2 | | 8/1997 |
| GB | 2058911 A | * | 4/1981 |

OTHER PUBLICATIONS

International Search Report dated Apr. 15, issued in corresponding international application No. PCT/SE2008/050046.

* cited by examiner

*Primary Examiner* — Noah Kamen
*Assistant Examiner* — Hung Q Nguyen
(74) *Attorney, Agent, or Firm* — Ostrolenk Faber LLP

(57) ABSTRACT

An arrangement for warming the oil in a gearbox in a vehicle powered by a combustion engine. A first pipe system with a first flow device which makes possible circulation of oil from the combustion engine through a heat exchanger. A second pipe system with a second flow device makes possible circulation of oil from the gearbox through the heat exchanger. A control device controls the flow devices so that flow of oil through the heat exchanger is obtained in situations in which the oil in the gearbox is at a too low temperature with respect to a desired temperature. The motor oil in the combustion engine can thus be used for heating the oil in the gearbox during cold starts of the combustion engine.

16 Claims, 1 Drawing Sheet

ARRANGEMENT FOR HEATING OIL IN A GEARBOX

CROSS REFERENCE TO RELATED APPLICATION

The present application is a 35 U.S.C. §§371 national phase conversion of PCT/SE2008/050046, filed Jan. 16, 2008, which claims priority of Swedish Application No. 0700220-7, filed Jan. 30, 2007, the disclosure of which incorporated by reference herein. The PCT International Application was published in the English language.

BACKGROUND TO THE INVENTION, AND STATE OF THE ART

Present invention relates to an arrangement for warming of oil in a gearbox.

When an engine-powered vehicle is started after a period of being switched off, the oil in a gearbox is at substantially the same temperature as the surroundings. When the surroundings are at a low temperature, the oil in the gearbox is in a more or less viscous state. During cold starts of the vehicle, the viscous consistency of the oil therefore results in the consumption of a large amount of extra energy for driving the components of the gearbox. The viscous consistency of the oil also means that greater force is required for engaging different gears in the gearbox. The oil in the gearbox is mainly warmed by the friction heat generated by the components of the gearbox performing their mechanical work. Such warming is not particularly effective, so a relatively long time may be required for the oil in the gearbox to reach its operating temperature after a cold start. After a cold start of the vehicle, the components of the gearbox have therefore to be provided with extra driving power for a relatively long time until the oil in the gearbox reaches a desired temperature and consistency. Partly for this reason, a large amount of extra fuel is consumed during a cold start.

DE 44 31 351 refers to an arrangement for warming a combustion engine and the oil in a gearbox during cold starts of a vehicle. The arrangement comprises a pipe system with a circulating medium. A heat source supplies heat to the circulating medium before the latter is circulated through the combustion engine and/or through a heat exchanger which warms the oil of the gearbox. The circulating medium may take the form of the coolant of the existing cooling system which cools the combustion engine. The heat source operable to warming the circulating medium is not herein specified in more detail. The only point to note is that the heat source does with advantage use latent heat energy for warming the circulating medium.

SUMMARY OF THE INVENTION

The object of present invention is to provide an arrangement for reducing the fuel consumption of a combustion engine during cold starts.

This object is achieved with the arrangement of the invention. During a cold start of a vehicle, the motor oil is warmed relatively quickly by the heat generated by the combustion processes of the combustion engine. It is therefore possible to use the motor oil to warm the oil in the gearbox. With such warming, the oil in the gearbox can undergo almost as rapid warming as the motor oil. The length of the cold start period during which the oil in the gearbox is at too low a temperature and is too viscous can therefore be considerably reduced. The increased fuel consumption arising from the viscous consistency of the oil may thus occur during a reduced period of time. The amount of extra fuel consumed during a cold start of a vehicle with an arrangement as above will therefore be markedly less than in the conventional case. The heat energy used to warm the oil in the gearbox is derived indirectly from the heat energy generated during the combustion processes in the combustion engine. This heat energy is available in the vehicle as soon as the combustion engine has started, so no energy need be stored or supplied externally for warming the oil in the gearbox. The result is no extra cost for the energy used for warming the oil in the gearbox.

According to an embodiment of the present invention, a first pipe system comprises an inlet aperture so positioned that it receives motor oil from an oil pan in the combustion engine. The motor oil in the combustion engine is normally stored in an oil pan.

Warm oil which has cooled and lubricated the combustion engine accumulates in the oil pan. The oil in the oil pan thus relatively quickly acquires a raised temperature after starting of the combustion engine. Using the motor oil in the oil pan to warm the oil in the gearbox is therefore advantageous. The first pipe system comprises with advantage a flow means in the form of a pump. The pump may be adapted to starting substantially immediately after the combustion engine is started or as soon as a specified temperature difference between the motor oil in the oil pan and the oil in the gearbox occurs.

According to another embodiment of the invention, the first pipe system comprises an inlet aperture so positioned that it receives motor oil from an oil duct situated downstream of an existing oil pump in the combustion engine. The oil at that location is pressurised by the oil pump. The existing oil pump of the combustion engine may therefore be used to circulate motor oil through the first pipe system. The first pipe system comprises with advantage a flow means in the form of a valve. The fact that in this case motor oil at above atmospheric pressure is available at an inlet aperture to the first pipe system means that a valve can be used for controlling the flow of the motor oil through the first pipe system. The valve is settable in at least an open position and a closed position.

According to another embodiment of the invention, a second pipe system comprises an inlet aperture so positioned that it receives motor oil from an oil pan in the gearbox. Gearboxes are normally provided with an oil pan at a bottom surface to receive and accumulate oil. It is therefore relatively easy to lead oil in from the oil pan to the second pipe system. The second pipe system comprises with advantage a flow means in the form of a pump. The pump may be adapted to starting substantially immediately after the combustion engine has started or as soon as the motor oil in the oil pan has reached a suitably high temperature than the oil in the gearbox.

According to another preferred embodiment of the invention, the second pipe system comprises an inlet aperture so positioned that it receives motor oil from an oil duct situated downstream of an existing oil pump in the gearbox. At this location the oil has been pressurised by the oil pump. The existing oil pump in the gearbox can therefore be used to circulate oil through the second pipe system. The second pipe system comprises with advantage a flow means in the form of a valve. The fact that in this case oil at above atmospheric pressure is available at an inlet aperture to the second pipe system makes it possible to use a relatively simple valve settable between an open position and a closed position to control the flow of the oil through the second pipe system.

According to another preferred embodiment of the invention, said control means comprises a temperature sensor adapted to detecting a temperature related to the temperature of the oil in the gearbox, and a control unit adapted to receiving information from said temperature sensor concerning the temperature of the oil in the gearbox and to activating said flow means in the first pipe system and said flow means in the second pipe system in at least certain situations in which the oil in the gearbox is at too low a temperature with respect to a desired temperature. If the control unit finds that the oil in the gearbox is at too low a temperature with respect to a desired temperature, it can directly activate said flow means so that motor oil and oil from the gearbox are led through the heat exchanger. Alternatively, the control unit may also receive information from a temperature sensor concerning the temperature of the motor oil and only activate said flow means when a suitable temperature difference has arisen between the motor oil and the oil in the gearbox after a cold start of the combustion engine.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
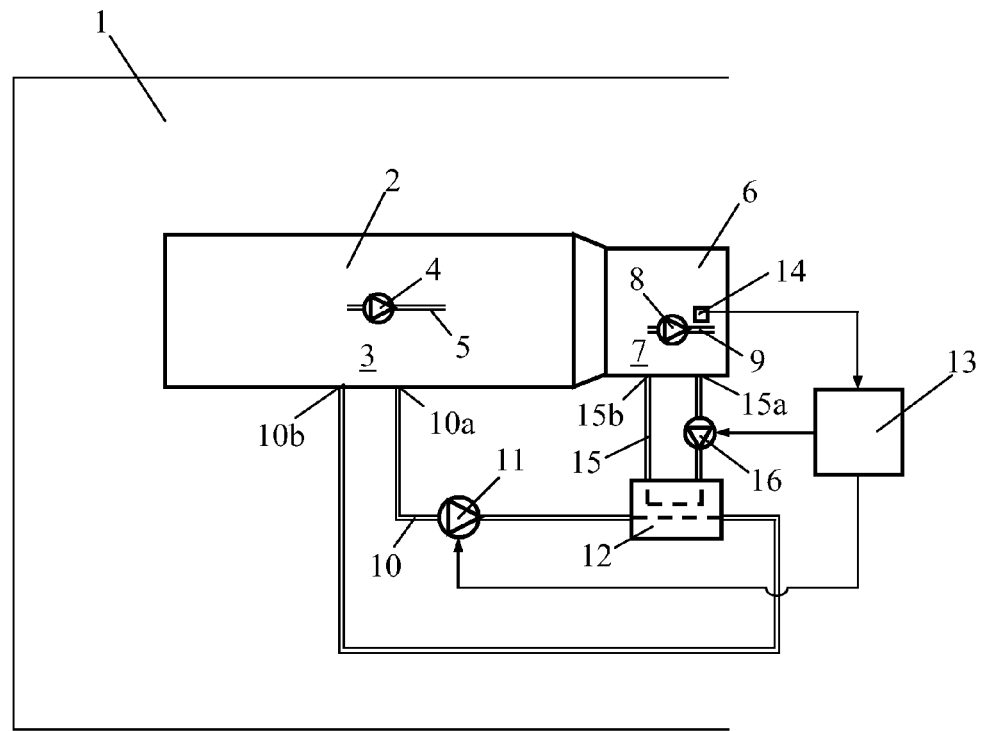
FIG. 1 depicts an arrangement for warming oil in a gearbox according to a first embodiment of the invention and FIG. 2 depicts an arrangement for warming oil in a gearbox according to a second embodiment of the invention.

FIG. 1 depicts schematically a vehicle 1 powered by a combustion engine 2. The vehicle 1 may be a heavy vehicle powered by a combustion engine 2 in the form of a supercharged diesel engine. The combustion engine 2 is in a conventional manner lubricated and cooled by a circulating motor oil. The combustion engine 2 comprises at a bottom surface a schematically depicted oil pan 3 for receiving and accumulating oil. An oil pump 4 is adapted to drawing oil from the oil pan 3. The oil drawn is pushed by the pump 4 through an oil duct 5 to an undepicted oil filter and thereafter through ducts which lead the oil to the points where the engine needs lubrication. When the oil has lubricated said points in the combustion engine, it runs back and accumulates in the oil pan 3. The oil undergoes warming in said ducts by the heat generated during the combustion processes in the combustion engine. The oil in the oil pan 3 thus undergoes relatively rapid warming after starting of the combustion engine 2.

A gearbox 6 is arranged close to the combustion engine 2. The gearbox 6 is in a conventional manner lubricated and cooled by a circulating oil. The gearbox 6 comprises a schematically depicted oil pan 7 situated at a bottom surface of the gearbox 6 for receiving and accumulating oil. An oil pump 8 is adapted to drawing oil from the oil pan 7. The oil drawn is pushed by the pump 8 through a duct 9 and a number of further ducts which lead the oil to the points where the gearbox 6 needs lubrication. When the oil has lubricated said points in the gearbox 6, it runs back and accumulates in the oil pan 7. The oil undergoes warming by the friction generated by the movable parts of the gearbox 6. However, this warming is relatively modest, so the oil undergoes relatively slow warming in a conventional gearbox after the starting of a combustion engine. When the oil in a gearbox 6 is cold, it is usually viscous. During cold starts of the vehicle, driving the components of the gearbox therefore involves consumption of a large amount of extra fuel before the oil has warmed to a desired operating temperature and has acquired a desired consistency.

The combustion engine 2 and the gearbox 6 in FIG. 1 are provided with an arrangement for reducing the vehicle's fuel consumption during, in particular, cold starts. The arrangement comprises a first pipe system 10 for circulation of motor oil through a heat exchanger 12. The first pipe system 10 comprises a pump 11 adapted to being activated by a control unit 13. The control unit 13 is adapted to receiving information from a temperature sensor 14 concerning the temperature of the oil in the gearbox 6. When the pump 11 is activated, it pumps the motor oil to the heat exchanger 12 via an inlet aperture 10a of the first pipe system 10. The inlet aperture 10a is so positioned that it receives motor oil from the oil pan 3 of the combustion engine 2. When the motor oil has passed through the heat exchanger 12, it is led back to the oil pan 3 via an outlet aperture 10b of the pipe system 10. The arrangement also comprises a second pipe system 15 for circulation of oil from the gearbox 6 through the heat exchanger 12. The second pipe system 15 comprises a pump 16 adapted to being activated by the control unit 13. When the pump 16 is activated, it pumps the oil from the gearbox 6 to the heat exchanger 12 via an inlet aperture 15a of the second pipe system 15. The inlet aperture 15a is so positioned that it receives motor oil from the oil pan 7 of the gearbox 6. When the oil has passed through the heat exchanger 12, it is led back to the oil pan 7 via an outlet aperture 15b of the pipe system 15.

When the combustion engine 2 is started, the control unit 13 receives information from the temperature sensor 14 concerning the temperature of the oil in the gearbox. If the temperature of the oil is below a reference value, the control unit 13 activates the pump 11 so that motor oil is led through the first pipe system 10 and hence through the heat exchanger 12. The reference value may correspond to a lower acceptable value in a temperature range within which the temperature of the oil should be during operation in order to exhibit optimum characteristics. The control unit 13 also activates the pump 16 so that oil from the gearbox 6 is led through the second pipe system 15 and hence through the heat exchanger 12. The motor oil in the combustion engine 2 undergoes relatively rapid warming to a desired operating temperature by the heat generated during the combustion processes in the combustion engine 2. With the arrangement defined above, the warm motor oil in the first pipe system 10 is used by means of said heat exchanger 12 to warm oil of the gearbox 6 which is circulated in the second pipe system 15. This heat transfer provides the oil in the gearbox 6 with almost as rapid warming as the motor oil after the combustion engine 2 has started. When the temperature sensor 14 indicates that the oil in the gearbox 6 has reached the aforesaid reference temperature, the control unit 13 switches off the pumps 11, 16, thereby halting the circulation of oil through the heat exchanger 12 and the warming of the oil in the gearbox 6 by the motor oil. Such an arrangement enables relative rapid warming of the oil in the gearbox to a desired temperature after a cold start of the combustion engine. The result is that the initially viscous oil in the gearbox also relatively quickly acquires a desired consistency. The relatively rapid warming of the oil in the gearbox results in a clearly shorter period of high fuel consumption caused by the viscous consistency of the oil in the gearbox 6. The heat used for warming the oil in the gearbox 6 is derived indirectly from the combustion processes in the combustion engine 2. There is normally a surplus of this heat which is cooled away by the cooling system of the combustion engine. Using this heat energy already existing in the vehicle means that no external heat energy need be supplied for warming the oil in the gearbox.

Figure 2:
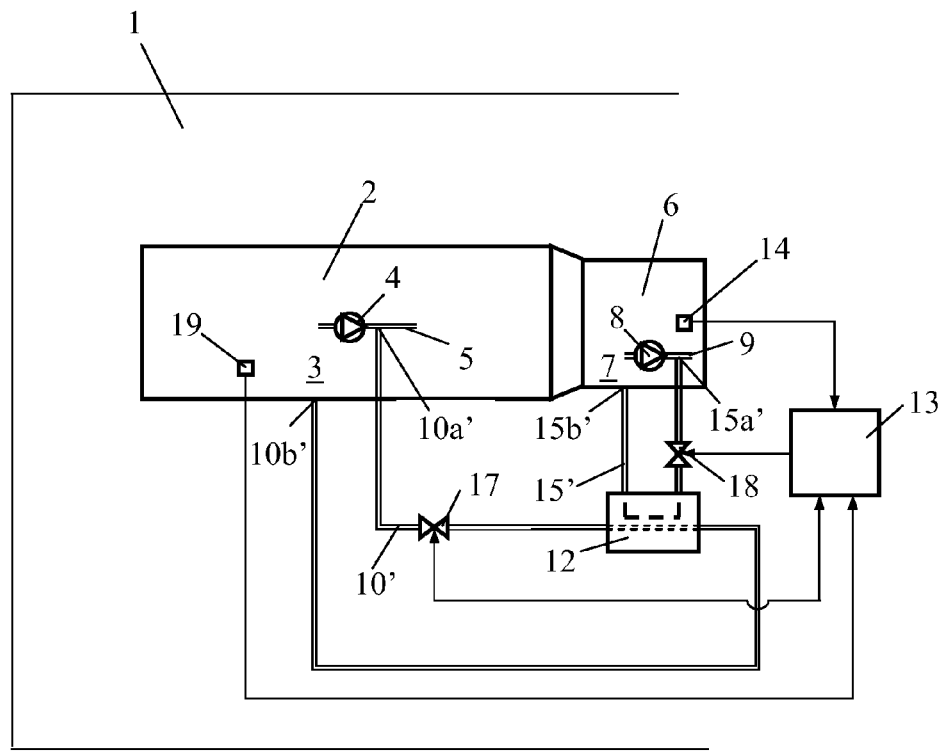

FIG. 2 depicts an alternative embodiment of the arrangement. This case involves the use of a first pipe system 10' which comprises an inlet aperture 10a' so positioned that it receives motor oil from the duct 5 situated downstream of the existing oil pump 4 in the combustion engine 2. Since the motor oil at that location is at above atmospheric pressure, this case needs no separate pump for providing a flow of motor oil through the first pipe system 10'. The first pipe system 10' here comprises instead a valve 17 settable in an open position and a closed position. The valve 17 is controlled by the control unit 13. This case involves the use of a second pipe system 15' which comprises an inlet aperture 15a' so positioned that it receives oil from the duct 9 situated downstream of the existing oil pump 8 in the gearbox 6. Since the oil at this location is at above atmospheric pressure, there is no need for a separate pump to provide a flow of oil through the second pipe system 15'. The second pipe system 15' here comprises instead a valve 18 settable in an open position and a closed position. The valve 18 is controlled by the control unit 13. A temperature sensor 19 is arranged here to detect the temperature of the motor oil in the oil pan 3 of the combustion engine. The control unit 13 receives information from the temperature sensor 19 concerning the temperature of the motor oil.

When the combustion engine 2 is started, the control unit 13 receives information from the temperature sensor 14 concerning the temperature of the oil in the gearbox 6 and from the temperature sensor 19 concerning the temperature of the motor oil in the combustion engine 2. The control unit 13 ascertains initially whether the temperature of the oil in the gearbox is below a reference value. If such is the case, the control unit compares the temperature of the motor oil with the temperature of the oil in the gearbox. When a predetermined temperature difference obtains, the control unit 13 opens the valve 17 so that motor oil is led through the first pipe system 10' and hence through the heat exchanger 12. The control unit 13 also opens the valve 18 so that oil from the gearbox 6 is led through the second pipe system 15' and hence through the heat exchanger 12. The motor oil in the first pipe system 10' is thus warmer than the oil in the second pipe system 15'. The oil in the second pipe system 15' thus undergoes warming by the motor oil in the first pipe system 10' in the heat exchanger 12. The warmed oil in the second pipe system 15' is led back to the gearbox 6 and accumulates in the oil pan 7 via an outlet aperture 15b' in the second pipe system 15'. The oil in the gearbox 6 thus undergoes relatively rapid warming to its reference temperature. The motor oil which is circulated in the first pipe system 10' and is used for heating the oil in the second pipe system 15' is led to the oil pan 3 of the combustion engine 2 via an outlet aperture 10b' of the first pipe system 10'. When the oil in the gearbox reaches the reference temperature, the control unit 13 closes the valves 17, 18 so that the circulation and hence the heat transfer in the heat exchanger 12 between the motor oil and the oil in the gearbox cease.

The invention is in no way limited to the embodiments described but may be varied freely within the scopes of the claims. For example, the first pipe system 10 in FIG. 1 may be used with a second pipe system 15' depicted in FIG. 1. Correspondingly, the first pipe system 10' in FIG. 2 may be used together with a second pipe system 15 depicted in FIG. 1. The valves 17, 18 may take the form of thermostatic valves which themselves detect the respective oil temperatures and open and close at a predetermined temperature.

The invention claimed is:

1. An arrangement for warming oil in a gearbox of a combustion engine which is lubricated and cooled by a motor oil, the arrangement comprising:
   a first pipe system, a first flow device operable for circulating motor oil from the combustion engine through the first pipe system;
   a second pipe system separate from the first pipe system, a second flow device operable for circulating oil from the gearbox through the second pipe system;
   a heat exchanger connected to the first pipe system and to the second pipe system and configured for causing a heat exchange in the heat exchanger between the oils in the first and the second pipe systems, and
   a control device operative to control the first and second flow devices so that the oils are circulated through their respective pipe systems and are selectively circulated through the heat exchanger in at least certain situations in which the oil in the gearbox is at a temperature below a desired temperature.

2. An arrangement according to claim 1, wherein the first pipe system has an inlet aperture positioned and configured to receive motor oil from an oil pan of the combustion engine.

3. An arrangement according to claim 2, wherein the first flow device is in the form of a pump for oil from the oil pan.

4. An arrangement according to claim 2, wherein the second pipe system has an inlet aperture positioned and configured to receive oil from an oil pan of the gearbox.

5. An arrangement according to claim 4, wherein the second flow device is in the form of a pump for oil from the oil pan.

6. An arrangement according to claim 4, further comprising an oil duct situated downstream in oil flow of an oil pump in the gearbox; and
   the second pipe system has an inlet aperture positioned and configured to receive oil from the oil duct.

7. An arrangement according to claim 6, wherein the second flow device comprises a valve operable to control flow in the second pipe system.

8. An arrangement according to claim 1, further comprising an oil duct situated downstream in oil flow of an oil pump in the combustion engine and
   the first pipe system has an inlet aperture positioned and configured to receive motor oil from the oil duct.

9. An arrangement according to claim 8, wherein the first flow device comprises a valve operable to control flow in the first pipe system.

10. An arrangement according to claim 1, wherein the second pipe system has an inlet aperture positioned and configured to receive oil from an oil pan of the gearbox.

11. An arrangement according to claim 10, wherein the second flow device is in the form of a pump for oil from the oil pan.

12. An arrangement according to claim 1, further comprising an oil duct situated downstream in oil flow of an oil pump in the gearbox; and
   the second pipe system has an inlet aperture positioned and configured to receive oil from the oil duct.

13. An arrangement according to claim 12, wherein the second flow device comprises a valve operable to control flow in the second pipe system.

14. An arrangement according to claim 1, wherein the control device comprises a temperature sensor operable to detect a temperature related to the temperature of the oil in the gearbox, and a control unit operable to receive information from the temperature sensor concerning the temperature of oil in the gearbox and operable to activate the first flow device in the first pipe system and the second flow device in the second pipe system in at least certain situations in which the oil in the gearbox is below a desired temperature.

15. A combustion engine which is lubricated and cooled by a motor oil, the engine including:
   an oil pan of the engine;
   a gearbox, an oil pan of the gearbox; and
   the arrangement of claim 11.

16. A combustion engine according to claim 15, wherein the control device of the arrangement comprises a temperature sensor operable to detect a temperature related to the temperature of the oil in the gearbox, and a control unit operable to receive information from the temperature sensor concerning the temperature of oil in the gearbox and operable to activate the first flow device in the first pipe system and the second flow device in the second pipe system in at least certain situations in which the oil in the gearbox is below a desired temperature.

* * * * *